United States Patent [19]

Inoue

[11] 4,450,337

[45] May 22, 1984

[54] EDM METHOD AND APPARATUS WITH A CONTINUOUS DC SUPPLY USING STRAY GAP CAPACITANCE TO TRIGGER DISCHARGE

[75] Inventor: Kiyoshi Inoue, Tokyo, Japan

[73] Assignee: Inoue-Japax Research Incorporated, Yokohama, Japan

[21] Appl. No.: 358,875

[22] Filed: Mar. 16, 1982

[30] Foreign Application Priority Data

Mar. 20, 1981 [JP] Japan .................................. 56-40768

[51] Int. Cl.[3] .............................................. B23P 1/08
[52] U.S. Cl. .............................. 219/69 M; 219/69 G; 219/69 P
[58] Field of Search ................. 219/69 C, 69 P, 69 R, 219/68, 69 S, 69 G

[56] References Cited

U.S. PATENT DOCUMENTS

| | | | |
|---|---|---|---|
| 3,956,609 | 5/1976 | Marendaz | 219/69 C |
| 4,237,370 | 12/1980 | Ullmann | 219/69 C |
| 4,338,504 | 7/1982 | Gray | 219/69 C |

Primary Examiner—M. H. Paschall
Attorney, Agent, or Firm—Karl F. Ross; Herbert Dubno

[57] ABSTRACT

An EDM method and apparatus in which a continuous DC voltage is applied across the EDM gap via a first switch held conductive, and a stray capacitance distributed in the supply circuit including the EDM gap is recurrently charged and discharged to produce successive electrical discharges between the tool electrode and the workpiece. A gap sensor monitors the magnitude of high-frequency signals contained in the successive discharges and, when the sensed magnitude falls below a threshold level, provides a trigger signal which is used to turn on a second switch connected across the EDM gap in parallel with the DC source to short-circuit the EDM gap, thereby terminating the successive discharges. The conducting second switch serves to discharge the residual charge on the stray capacitance and prevents charge build-up thereon. Then the first switch may be turned off. The time interval in which the gap is free from current flow continues until the first switch is turned on following the turn-off of the second switch. The cycle is repeated.

17 Claims, 4 Drawing Figures

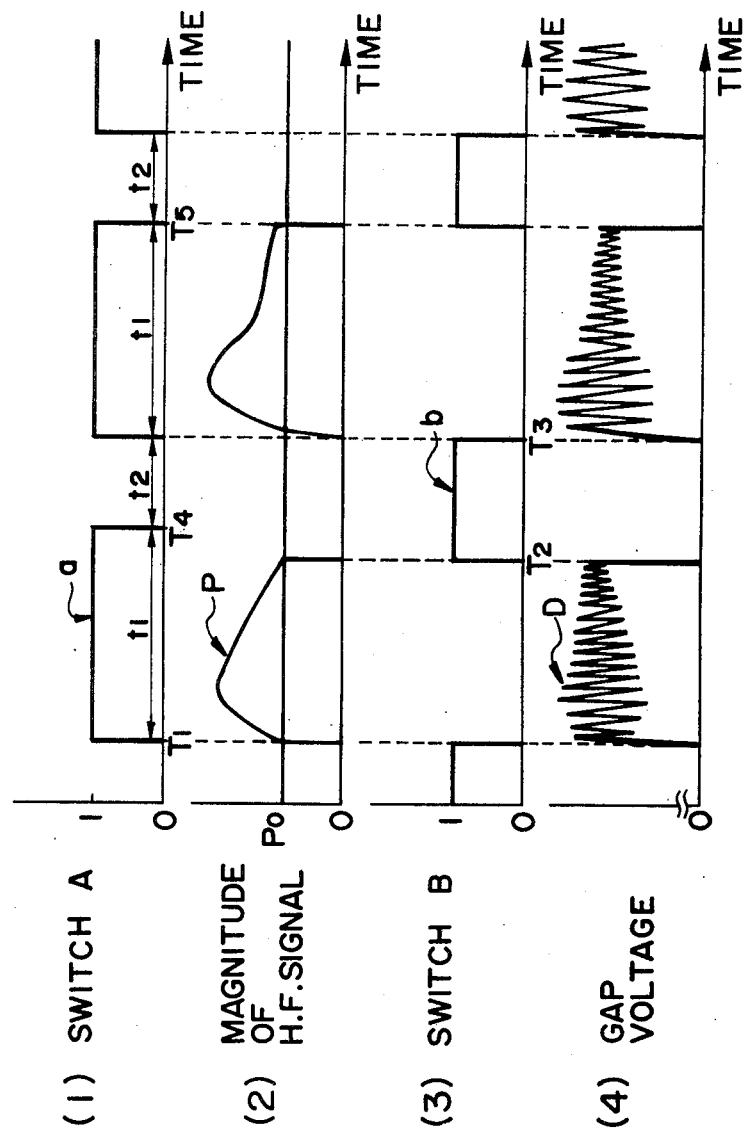

EDM METHOD AND APPARATUS WITH A CONTINUOUS DC SUPPLY USING STRAY GAP CAPACITANCE TO TRIGGER DISCHARGE

FIELD OF THE INVENTION

The present invention relates to a method of and apparatus for machining a conductive workpiece by effecting successive electrical discharges between a tool electrode and the workpiece across a dielectric-filled machining gap. The invention is particularly concerned with an electrical discharge machining (EDM) method and apparatus in which a DC voltage is continuously applied to the machining gap in a time period and used, without being pulsed, to produce successive electrical discharges within the time period, and such time periods are provided recurrently with a time interval to progressively machine the workpiece.

BACKGROUND OF THE INVENTION

Conventional EDM power feed systems, various types of which have been in practical use, commonly employ a discharge pulsing means which is customarily a bank of transistors or other electronic switching elements connected between a DC source and the machining gap. Such switching means is, according to a conventional EDM principles, designed to chop the continuous DC output and to be periodically or aperiodically switched by an oscillator which provides a succession of pulsing signals corresponding in time parameters, i.e. on-time, off-time and frequency, precisely to electrical discharges to be created across the machining gap. When the switching means is turned on and off with each individual pulsing signal, the continuous DC output of the source is chopped or "pulsed", thereby developing each individual localized and discrete machining discharge or energy pulse through the gap. Thus, a succession of machining electrical discharges are governed and exactly controlled by a corresponding succession of pulsing signals preset in the oscillator. Such a conventional design of pulsing circuitry is based on the common recognition in the art that a well-defined, discrete and quantumized power is preferred to achieve discharge stock removal. If the continuous power is not pulsed, it has commonly been believed that there would only result an arc discharge which tends to thermally damage the tool electrode or workpiece or both. It has also been commonly recognized to be essential to minimize a stray capacitance in the gap discharge circuit since it would causse a serious distortion of the discharge waveform and cause it to deviate considerably from the rectangular waveform of the pulsing signals.

OBJECTS OF THE INVENTION

It is an important object of the present invention to provide a novel and improved EDM method and apparatus capable of achieving an extremely fine EDM finish.

Another object of the invention is to provide an EDM method and apparatus which enable an extremely fine finish to be achieved with an extremely low wear of the tool electrode.

A further object of the invention is to provide an EDM method and apparatus which afford an excellent machined quality, an extremely stable machining performance, a high removal rate and a low tool wear.

SUMMARY OF THE INVENTION

The present inventor has recognized that it is possible to use a continuous voltage without pulsing to provide a succession of stock removal discharges when resort is made to a stray capacitance distributed in the gap discharge circuit. The stray capacitance is distributed in a semiconductor power switching circuit, lead circuits and interfaces with mechanical devices commonly incorporating electrical insulators and can be used positively according to the present invention. The stray capacitance presents an imaginary equivalent capacitor in parallel with the machining gap. The continuous DC output is applied across the machining gap to permit this capacitor to charge and discharge the charge thereon repetitively at a high frequency, thereby producing a succession of high-frequency fine electrical discharges through the machining gap. The successive, discrete and localized discharges are allowed to continue until the gap contamination with discharge products, i.e. or the concentration of discharge products in the discharge gap reaches a critical level. It has been found that arrival at this critical level can be ascertained by monitoring high-frequency (HF) waves or signals emitted from the discharge gap to provide an interruption signal. The interruption of the continuous DC voltage continuously applied across the machining gap is made advantageously by shunting the DC voltage through a switch connected in parallel with the gap and the DC source and switched on when the output level of the high-frequency signals, preferably in a frequency range of 10 to 30 MHz, falls below a predetermined threshold value. A minimum interruption time interval is provided by holding the gap-shunting switch conductive before the DC voltage is again caused to develop across the machining gap through a switch connected in series between the DC source and the machining gap. Preferably, the series switch is turned off shortly after the gap-shunting switch is turned on.

According to the present invention there is thus provided, in a first aspect thereof, a method of machining a workpiece by effecting successive electrical discharges between a tool electrode and the workpiece across a dielectric-filled machining gap, which method comprises the steps of: (a) connecting a first switch in a series circuit between a DC source and the machining gap, having only a stray capacitance contained therein; (b) connecting a second switch across the machining gap in parallel with the DC source; (c) turning the first switch on to apply a DC output voltage directly to the machining gap to permit the stray capacitance to repetitively charge and discharge the charge thereon, thereby producing a succession of electrical discharges through the machining gap; (d) sensing the output level of high-frequency signals contained in the successive discharges and, upon the sensed level falling below a predetermined threshold value corresponding to a critical level of contamination of the gap with discharge products, issuing a gap-shunting signal; (e) in response to the gap-shunting signal, turning the second switch on and thereby short-circuiting the machining gap to terminate the electrical discharges while permitting the first switch to be turned off; and subsequent to step (e), (f) establishing a discharge-free interval in the machining gap and repeating step (c), (d) and (e) in sequence to progressively machine the workpiece.

The invention also provides, in a second aspect thereof, an apparatus for machining a conductive workpiece by effecting successive electrical discharges between a tool electrode and the workpiece across a dielectric-filled machining gap, which apparatus comprises: first switch means connected in a series circuit between a DC source and the machining gap, containing a stray capacitance therein; second switch means connected across the machining gap in parallel with the DC source; first switching means for turning the said first switch means on to apply a DC output voltage of the source directly to the machining gap and thereby to permit the stray capacitance to repetitive charge and discharge the charge thereon whereby a succession of electrical discharges are produced through the machining gap; sensing means for sensing the output level of high-frequency signals of the successive electrical discharges and, upon the sensed level falling below a predetermined threshold value, issuing a gap-shunting signal; second switching means operable in response to the gap-shunting signal for turning the second switch on and thereby short-circuiting the machining gap to terminate the electrical discharges while permitting the first switch means to be turned off; and a timer means associated with the second switching means for establishing a time period in which the machining gap is free from electrical discharge.

BRIEF DESCRIPTION OF THE DRAWING

These and other features of the invention as well as advantages thereof will becom more readily apparent from the following description of certain preferred embodiments thereof made with reference to the accompanying drawing in which:

FIG. 4(-4(4) are waveform diagrams illustrating signals which develop at several portions of the apparatus of FIG. 3.

SPECIFIC DESCRIPTION

Figure 1:
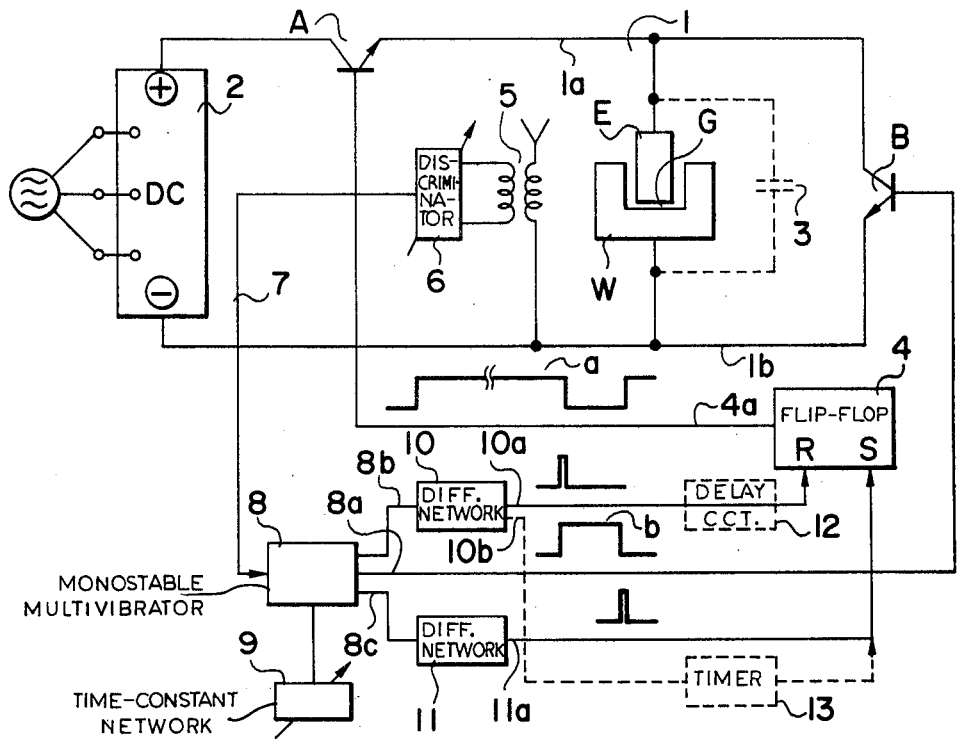
FIG. 1 is a circuit diagram illustrating an apparatus of the invention embodied in one form.

Referring to FIG. 1, a tool electrode E is shown spacedly juxtaposed with a workpiece W across a machining gap G supplied with a dielectric liquid which may be a liquid hydrocarbon or distilled water medium. While the tool electrode E is shown in the form of a solid electrode for sinking a cavity in the workpiece E, it will be apparent that it may be of any form such as, for example a wire-ribbon or tape for traveling-wire EDM. As material removal proceeds as will be described, the tool electrode E and workpiece W are relatively displaced to progressively machine the workpiece W.

A first switch A shown as a transistor is connected in a series circuit 1 between a DC source 2 and the maching gap G. The DC source 2 may as customarily comprise a rectifier fed with a transformed or untransformed AC output of the commercial single-phase or poly-phase AC supply and provides a continuous DC output power of a regulated voltage level. A transformer and other customary components should be assumed to be contained in the DC source 2.

While the DC source 2 is directly connected via the switch A to the machining gap G, there is inherently distributed a stray capacitance in the connecting circuit 1 which includes the machining gap G. Specifically, stray capacitances are present generally across the machining gap G between the tool electrode E and the workpiece W separated by the liquid dielectric, at the interfaces between the emitter and base electrodes of a semiconductor element in the switch A, and between the parallel conductors in a printed circuit board, lead cables 1a and 1b, and at the portions of insulators for the electrode supporting head and for the workpiece support. These stray capacitances present an equivalent capacitor across the machining gap G as shown by the phantom line and designated at 3. The capacitance of the equivalent capacitor 3 generally ranges between 0.01 to 1 microfarad and normally is 0.1 microfarad or less. A second switch B shown as a transistor is also connected across the machining gap G in parallel with the DC source 2.

Figure 2:
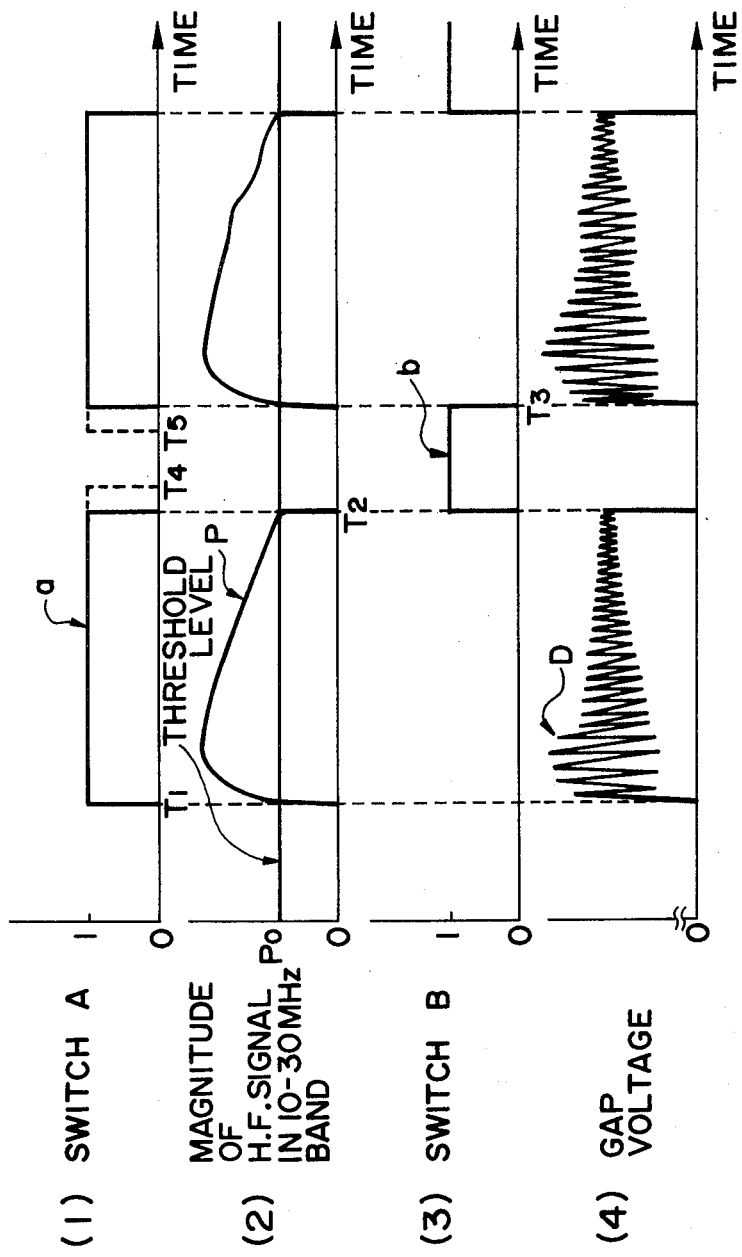
FIG. 2(1)–2(4) are waveform diagrams illustrating signals which develop at various portions of the apparatus of FIG. 1.

The first switch A is controlled by a flip-flop 4. When the latter is set to present a "1" signal (a) at its output terminal 4a, the transistor A is turned on, i.e. rendered conductive to develop the output voltage of the DC source 2 directly across the machining gap G. In FIG. 2(1), it is shown that the switch A is turned on at a time instant $T_1$. This will permit the equivalent capacitor 3 to recurrently charge and discharge the charge through the machining gap G at a high frequency, thus producing oscillatory discharges as shown at D in FIG. 2(4). These successive electrical discharges are discrete and strike on different localized portions both on the surfaces of the tool electrode E and the workpiece W, and yet contain and emit high-frequency waves or signals whose magnitude P, as shown in FIG. 2(2), initially rises and then gradually decays. It will eventually diminish to zero, indicating that the successive oscillatory discharges are converted into an undesirable arc discharge. It is apparent that as far as the HF magnitude P remains in excess of zero, the repetitive discharges continue stock removal. While in principle, no interruption of the DC output before it falls to zero appears to be required, it has now been found to be essential to shunt the DC output before the HF magnitude P diminishes to zero, thus to shunt the DC output when it falls below a preselected threshold level Po preset to correspond to a predetermined level of contamination of the discharge gap G with discharge products such as tar and gases.

A detector or sensing coil 5 is accordingly provided to derive a HF signal from the machining gap G. It has been found that the HF component in a frequency band between 10 and 30 $Mh_2$ can most reliably be monitored. The detector 5 should preferably be designed to selectively respond to such frequency signals. The sensed HF signal is monitored by a discriminator 6 which may be constituted by a Schmitt-trigger circuit. The discriminator 6 has an adjustable discrimination level preset therein which corresponds to a threshold value Po of the HF magnitude. It has been noted that the threshold value Po is set to correspond to a predetermined critical level of contamination of the discharge gap G with discharge products. When the sensed HF magnitude falls below the threshold value Po, the discriminator 6 issues a trigger signal which is fed via a line 7 to drive a monostable multivibrator 8 into operation. A "1" signal (b) thus develops at an output terminal 8a and is applied to the second swithc B to turn it on or render it conductive. In FIG. 2(3), it is shown that the switch B is turned on at a time instant $T_2$. The DC output of the source 2 is accordingly shunted through the switch B to terminate the successive discharges D as shown in FIG. 2(4). The monostable multivibrator 8 has an adjustable time-constant network 9 therein which establishes a time period in which the switch B is held on or conductive, holding the machining gap G free from current flow. In FIG. 2(3), it is shown that the switch B is turned off at a time instant $T_3$ to permit the DC output of the source 2 again to develop directly across the machining gap G. Thus, the multivibrator 7 constitutes a timer for establishing the time interval $T_2$–$T_3$.

The monostable multivibrator 8 has its second output terminal 8b connected to a differential network 10 which responds to the leading flank of the signal b to apply through its output terminal 10a trigger signal to the reset terminal R of the flip-flop 4. When the flip-flop 4 is reset, the signal a disappears at its output terminal 4a. The switch A is turned off at the time instant $T_2$ or slightly thereafter. The resetting trigger signal may alternatively be applied directly from the line 7 to the flip-flop 4.

The switch A may be turned off at a time instant $T_4$ a predetermined time after the switch B is turned on ($T_3$). To this end, a delay circuit 12 may be provided between the differential network 10 and the reset terminal R of the flip-flop 4 to delay the resetting trigger signal for that time period ($T_2$–$T_4$). Such a delayed timing is advantageous and preferred to remove the switching transient in the discharge gap G.

The monostable multivibrator 8 has its third output terminal 8c connected to a differential network 11 which responds to the trailing flank of the signal b to apply through its output terminal 11a a trigger signed to the set terminal S of the flip-flop 4. Then, the flip-flop 4 is again set to resume the signal a at its output terminal 4a. The switch A is turned on again at the time instant $T_3$ or slightly thereafter.

It should be noted that the shunting switch B while held conductive serves to discharge practically all residual charges on the machining gap G and further holds the gap free from practically any charge build-up during the discharge free interval $T_2$–$T_3$. This charge-shunting action is particularly important in eliminating the adverse influence of the stray capacitance on the surface finish and other machining end factors such as the tool electrode wear. It has been observed that if there is a substantial charge stored on the stray capacitance 3 during the discharge-free interval $T_2$–$T_3$, there develops an excessive build-up of the discharge peak current in an initial portion of successive discharges when the switch A is turned on and the excessive peak current tends to roughen the workpiece surface and cause substantial wear of the tool electrode. By shunting the machining gap G with the switch B and thereby permitting the charge stored on the stray capacitance 3 to be discharged through the switch B and thereby holding the chargeshunting path with the conducting switch B, these advarse effects of the stray capacitance 3 are effectively prevented and a uniform sequence of discrete, localized micro-discharges is allowed to develop in each cycle after the switch A is turned on. Accordingly, the surface roughness and the tool wear are both minimized.

The switch A may be turned on at a time instant $T_5$ a predetermined time before the switch B is turned off ($T_3$) or after the switch A is turned off ($T_2$ or $T_4$). To this end, the network 10 may have its second output 10b connected to the set terminal S of the flip-flop 4 via a timer 13 which defines a time period $T_2$–$T_5$ or $T_4$–$T_5$. By switching on the first switch A in advance of the switch-off of the second switch B, the switching transient action is here again eliminated advantageously.

In the foregoing novel circuit arrangement of the invention, it will be appreciated that successive, discrete and localized fine electrical discharges D are provided and allowed to continue as long as the magnitude P of the HF signal generated in the discharge gap G remains in excess of the threshold value Po. By presetting the threshold value according to the machining conditions, the machining gap is effectively free from any excessive accumulation of the discharge products. Advantageously, the fine electrical discharges allowed automatically to continue within each long time period $T_1$–$T_2$ individually serve as microenergy pulses which fully adapt themselves to the instantaneous gap conditions basically independent of external factors. These energy pulses are extremely fine and yet are allowed to automatically develop in the gap G at an extremely high frequency, thus affording a fine-finish machined surface. Yet, the successive micro-discharges are fully safe guarded against conversion into a damaging arcing discharge and hence assures continued stock removal stability. Yet advantageously, a current-free interval $T_2$–$T_3$ is provided to allow the machining gap to be flushed and the discharge products, i.e. machining chips, decomposed gases and tar, to be carried away therefrom with the dielectric medium. The time interval $T_2$–$T_3$ can be adjusted to a minimum according to the electrode and workpiece materials and other machining conditions (settings) and should generally range between 10 and 100 microseconds.

It is desirable to set the threshold level Po according to the machining conditions (settings). The greater the amount of discharge products which the machining conditions are set to yield within a given time, the greater the value at which the threshold should be set. Experimentation shows that the time period $T_1$–$T_2$ varies considerably from one cycle to another and generally ranges up to 100 to 500 microseconds, the particular practical upper limit depending upon the particular machining conditions.

Figure 3:
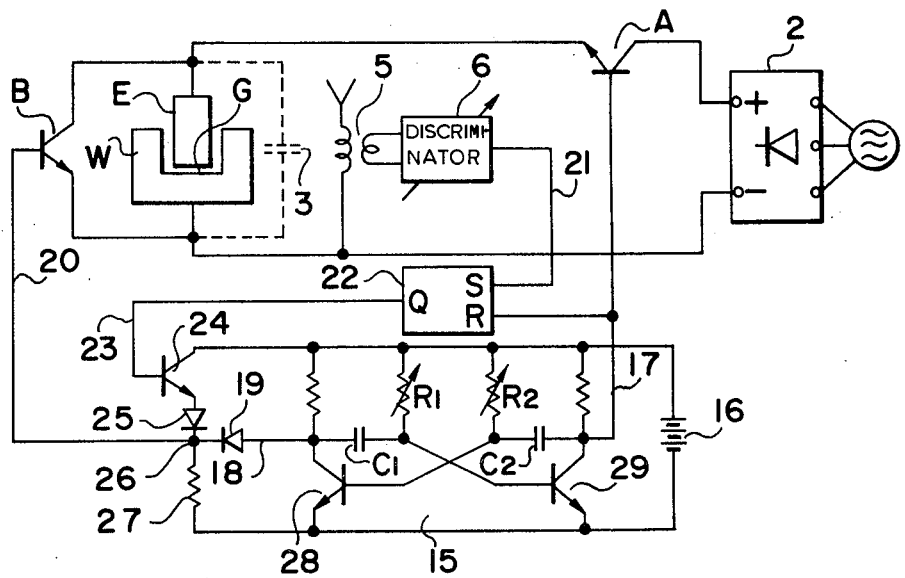
FIG. 3 is a circuit diagram illustrating an apparatus of the invention embodied in another form.

In the embodiment of FIG. 3 in which the same reference numerals as in FIG. 1 are used to designate the same parts, an astable multivibrator 15 is used to control the conduction of the first switch A. The second switch B is placed under control of this timing network 15 and also of the HF monitoring network 6. Thus, the multivibrator 15 operated by a voltage supply 16 has a first output terminal 17 fed into the first switch A and a second output terminal 18 fed via a diode 19 and a line 20 into the second switch B. The HF discriminator 6 is fed via a line 21 into the set terminal of a flip-flop 22 whose reset terminal is fed from the line 17. The output terminal Q of the flip-flop 22 is fed via a line 23 into the base terminal of a transistor 24 whose collector terminal is connected to the positive terminal of the voltage supply 16 and whose emitter terminal is connected via a diode 25 to the junction 26 of the diode 19 and the line 20. A resistor 27 is connected between the junction 26 and the negative terminal of the voltage supply 16. The multivibrator 15 may be of conventional design and is shown as comprising a pair of transistors 28 and 29 alternately rendered conductive and two time-constant networks of resistor $R_1$ and capacitor $C_1$ and resistor $R_2$ and capacitor $C_2$ cross-coupled with the transistors 28 and 29.

In the arrangement of FIG. 3, the switch A is periodically turned on and off with an on-time $t_1$ and an offtime $t_2$ (and a cyclic period of $t_1+t_2$) as shown in FIG. 4(1). As a result of the conduction of the switch A at a time resistant $T_1$, successive fine electrical discharges D develop across the machining gap G. When the flip-flop 22 is set in response to the output of the discriminator 6 indicating that the HF signal P falls below the threshold value Po, a "1" signal appears at the output Q and is applied to the transistor 24 to turn it on. This will cause a voltage drop to develop at the resistor 27 to turn the switch B on. The DC output of the source 2 is thus shunted through the transistor B and thereby terminates the high-frequency discharges D. In FIGS. 4(2) and 4(3) it is shown that at $T_2$ the HF signal falls below the threshold value Po and the switch B is turned on. The switch B is turned off at $T_3$ when the switch A is turned on after it is turned off at $T_4$. The flip-flop 22 is reset when the signal "1" disappears at the output terminal 17 of the multivibrator 17 and hence at $T_2$ when the switch A is turned off. The on-time $t_1$ and off-time $t_2$ may be preset to range between 100 and 500 microseconds and between 10 and 100 microseconds, respectively, by adjustably presetting the resistors $R_1$ and $R_2$.

In the arrangement of FIG. 3, it will be apparent that the discharge-free interval $T_2$–$T_3$ is variable while the offtime $t_2$ of the switch A is preset, the off-time $t_2$ establishing a preset minimum time interval in which the machining gap is free from the discharge currents. In the second cycle of operation shown in FIG. 4, it is seen that the HF signal P does not fall below the threshold value Po before the switch A is turned off and the switch B is turned on at $T_5$. Then the minimum discharge-free interval $t_2$ follows.

Having described certain preferred forms of the invention, it will be apparent that novel and improved EDM method and apparatus are provided.

What is claimed is:

1. A method of machining a workpiece by effecting successive electrical discharges between a tool electrode and the workpiece across a dielectric-filled machining gap, comprising the steps of:
    (a) connecting a first switch in a series circuit between a DC source and said machining gap, having a stray capacitance distributed therein;
    (b) connecting a second switch across said machining gap in parallel with said DC source;
    (c) turning said first switch on to apply a DC output directly to said machining gap and to permit said stray capacitance to repetitively charge and discharge the charge thereon, thereby producing a succession of successive, discrete electrical discharges through said machining gap between the tool electrode and the workpieces;
    (d) sensing the magnitude of high-frequency signals contained in said successive electrical discharges and, upon the sensed magnitude falling below a predetermined threshold level, issuing a gap-shunting signal;
    (e) in response to said gap-shunting signal, turning said second switch on and thereby short-circuiting said machining gap to terminate said successive electrical discharges while permitting said first switch to be turned off; and
    (f), subsequent to step (e), establishing a time interval in which said machining gap is free from current flow from said DC source and repeating steps (c), (d) and (e) in sequence to progressively machine said workpiece.

2. The method defined in claim 1, comprising: in step (d), sensing the magnitude of high-frequency signals of a frequency range between 10 and 30 MHz.

3. The method defined in claim 1 or claim 2, comprising: in step (e), turning said first switch off substantially simultaneously with the turning of said second switch on.

4. The method defined in claim 1 or claim 2, comprising: in step (e), turning said first switch off shortly after said second switch is turned on.

5. The method defined in claim 1 or claim 2, comprising: in step (e), turning said first switch off with a predetermined time delay after said second switch is turned on.

6. The method defined in claim 1 or claim 2 wherein said time interval is established at least in part by a time period in which said second switch is held on.

7. The method defined in claim 6 wherein said time period is fixed.

8. The method defined in claim 7 wherein said time period is in the range between 10 and 100 microseconds.

9. The method defined in claim 6 wherein said time period is variable but not less than a predetermined minimum duration.

10. The method defined in claim 9 wherein said minimum duration is in the range between 10 and 100 microseconds.

11. The method defined in claim 1 or claim 2, further compring the step of turning said second switch off substantially simultaneously with the turning of said first switch on.

12. The method defined in claim 1 or claim 2, further comprising the step of turning said second switch off shortly after said first switch is turned on.

13. The method defined in claim 1 or claim 2, further comprising the step of turning said second switch off with a predetermined time delay after said first switch is turned on.

14. The method defined in claim 1 or claim 2 wherein said first switch is held on for a time duration ranging between 100 and 500 microseconds.

15. The method defined in claim 1 or 2, further comprising the step of presetting said threshold level corresponding to a predetermined level of contamination of said gap with discharge products.

16. An apparatus for machining a workpiece by effecting successive electrical discharges between a tool electrode and the workpiece across a dielectric-filled machining gap, comprising:
    first switch means connected in a series circuit between a DC source and said machining gap, having a stray capacitance distributed therein;
    second switch means connected across said machining gap in parallel with said DC source;
    first switching means for turning said first switch means on to apply a DC output voltage of said source directly to said machining gap and thereby to permit said stray capacitance to charge and discharge the charge thereon so that successive, discrete electrical discharges are produced through said machining gap between the tool electrode and the workpiece by virtue of the discharge only of said stray capacitance;
    sensing means for sensing the magnitude of high-frequency signals contained in said successive electrical discharges and, upon said level falling below a predetermined threshold value, issuing a gap-shunting signal;

second switching means operable in response to said gap-shunting signal for turning said second switch means on and thereby short-circuiting said machining gap to terminate said successive electrical discharges while permitting said first switch means to be turned off; and a timer means associated with said second switching means for establishing a time period in which said machining gap is free from discharge current.

17. The apparatus defined in claim 16 wherein said sensing means is adapted to selectively sense said high-frequency signals in a frequency range between 10 and 30 MHz.

* * * * *